United States Patent
Kuribayashi et al.

(10) Patent No.: US 6,977,475 B2
(45) Date of Patent: Dec. 20, 2005

(54) AUTOMOTIVE ELECTRIC POWER SUPPLY APPARATUS

(75) Inventors: Masaru Kuribayashi, Tokyo (JP); Yoshihito Asao, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 59 days.

(21) Appl. No.: 10/352,875

(22) Filed: Jan. 29, 2003

(65) Prior Publication Data

US 2003/0141854 A1 Jul. 31, 2003

(30) Foreign Application Priority Data

Jan. 29, 2002 (JP) ........................ 2002-020109

(51) Int. Cl.[7] ............................................. H02P 5/20
(52) U.S. Cl. .................. 318/140; 318/158; 318/808; 290/40 C; 307/10.6
(58) Field of Search ................ 318/140–158, 318/138, 439, 139, 808, 254; 310/113, 114; 477/3; 290/45, 40 C, 40 R; 180/65.2, 65.4; 322/22, 17

(56) References Cited

U.S. PATENT DOCUMENTS

| | | | | |
|---|---|---|---|---|
| 4,336,485 A | * | 6/1982 | Stroud | 320/126 |
| 4,356,418 A | * | 10/1982 | Stroud | 310/184 |
| 4,454,464 A | * | 6/1984 | Stroud | 322/28 |
| 4,896,063 A | * | 1/1990 | Roberts | 310/68 R |
| 4,986,063 A | * | 1/1991 | Eggenmuller | 56/16.6 |
| 5,214,371 A | * | 5/1993 | Naidu | 322/29 |
| 5,397,975 A | * | 3/1995 | Syverson | 322/46 |
| 5,502,368 A | * | 3/1996 | Syverson et al. | 322/28 |
| 5,543,703 A | * | 8/1996 | Kusase et al. | 322/16 |
| 5,587,647 A | | 12/1996 | Bansal et al. | |
| 5,631,544 A | * | 5/1997 | Syverson et al. | 322/46 |
| 5,650,713 A | * | 7/1997 | Takeuchi et al. | 322/16 |
| 5,770,909 A | * | 6/1998 | Rosen et al. | 310/113 |
| 5,949,170 A | * | 9/1999 | Davis | 310/208 |
| 6,209,672 B1 | * | 4/2001 | Severinsky | 180/65.2 |
| 6,304,056 B1 | * | 10/2001 | Gale et al. | 320/104 |
| 6,323,625 B1 | * | 11/2001 | Bhargava | 322/32 |
| 6,338,391 B1 | * | 1/2002 | Severinsky et al. | 180/65.2 |
| 6,420,793 B1 | * | 7/2002 | Gale et al. | 290/34 |
| 6,445,079 B1 | * | 9/2002 | Gale et al. | 290/31 |
| 6,528,967 B2 | * | 3/2003 | Hallidy | 318/808 |
| 6,541,887 B2 | * | 4/2003 | Kawamura | 310/190 |
| 6,554,088 B2 | * | 4/2003 | Severinsky et al. | 180/65.2 |
| 6,593,751 B2 | * | 7/2003 | Takahashi | 324/551 |
| 6,700,214 B2 | * | 3/2004 | Ulinski et al. | 290/40 C |
| 6,700,242 B2 | * | 3/2004 | Kawamura | 310/68 R |
| 6,707,278 B2 | * | 3/2004 | Harmon | 322/37 |

(Continued)

FOREIGN PATENT DOCUMENTS

| | | |
|---|---|---|
| EP | 0391386 A2 | 10/1990 |
| EP | 1030545 A1 | 8/2000 |
| EP | 1134872 A2 | 9/2001 |
| JP | 5-111110 | 4/1993 |
| JP | 9-140004 | 5/1997 |
| JP | 2000-278807 A | 10/2000 |
| WO | WO 9825014 A2 * | 6/1998 |

*Primary Examiner*—Paul Ip
(74) *Attorney, Agent, or Firm*—Sughrue Mion, PLLC

(57) ABSTRACT

Each of the phases of coil in an armature winding of a dynamoelectric machine is constructed so as to have six turns, an inverter has a plurality of element-diode sets, each element-diode set including a pair of switching elements connected in series and diodes connected in parallel to the switching elements, connection points of the switching elements connected in series are connected to the dynamoelectric machine, a control apparatus controls the inverter such that the dynamoelectric machine is driven by supplying electric power from a first battery to the dynamoelectric machine during starting of an engine, and alternator mode electric power generation is performed by the dynamoelectric machine at least in a normal rotational speed region of the engine.

14 Claims, 9 Drawing Sheets

U.S. PATENT DOCUMENTS

| | | |
|---|---|---|
| 2001/0006292 A1 | 7/2001 | Inaba et al. |
| 2001/0022166 A1 * | 9/2001 | Yamaguchi et al. ...... 123/179.3 |
| 2001/0039230 A1 * | 11/2001 | Severinsky et al. ............ 477/3 |
| 2001/0045863 A1 * | 11/2001 | Pelly .......................... 327/552 |
| 2001/0048310 A1 * | 12/2001 | Takahashi ................... 324/551 |
| 2002/0047448 A1 * | 4/2002 | Kawamura .................. 310/181 |
| 2002/0060505 A1 * | 5/2002 | Kawamura .................. 310/184 |
| 2002/0070716 A1 * | 6/2002 | Gupta et al. .................. 322/59 |
| 2002/0084705 A1 * | 7/2002 | Kawamura ............... 310/68 R |
| 2002/0097025 A1 * | 7/2002 | Gale et al. ..................... 322/28 |
| 2002/0110461 A1 * | 8/2002 | Iwanami et al. ............ 417/321 |
| 2002/0125855 A1 * | 9/2002 | Johnson ...................... 318/801 |
| 2002/0158513 A1 * | 10/2002 | Amano et al. ............. 307/10.6 |
| 2003/0038482 A1 * | 2/2003 | Dubus et al. ............. 290/36 R |
| 2003/0107287 A1 * | 6/2003 | Nishimura et al. ......... 310/180 |
| 2003/0217876 A1 * | 11/2003 | Severinsky et al. ........ 180/65.2 |
| 2004/0012292 A1 * | 1/2004 | Kometani et al. .......... 310/184 |

* cited by examiner

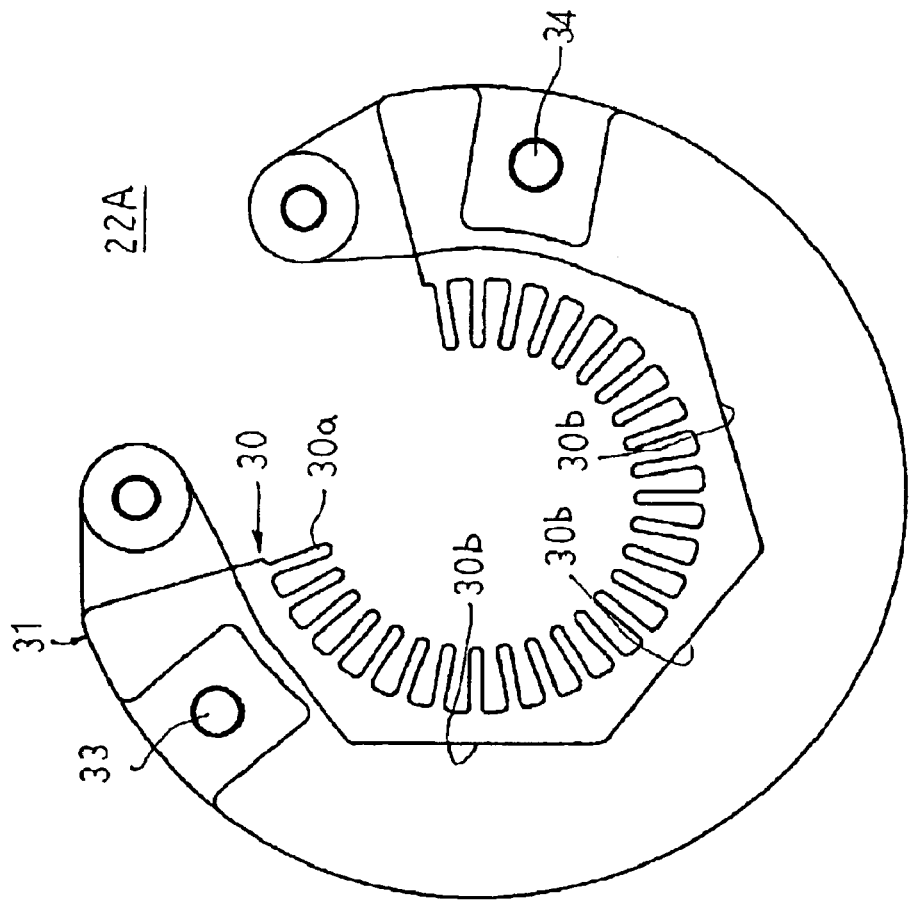
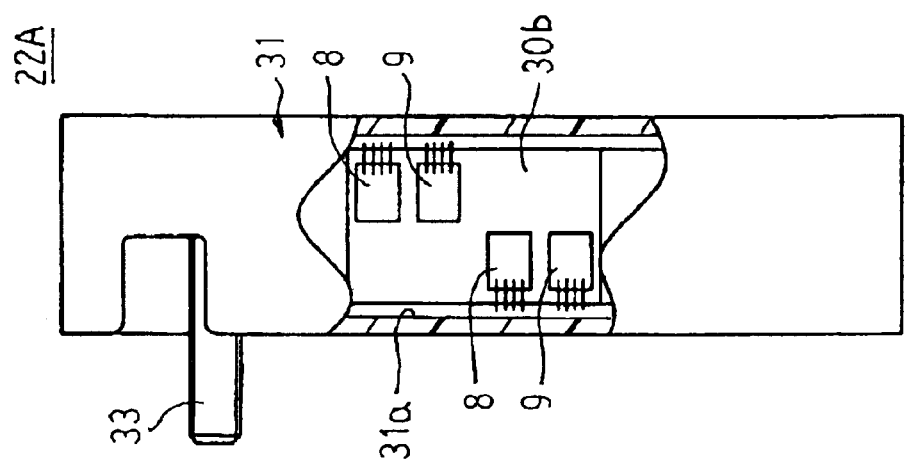

AUTOMOTIVE ELECTRIC POWER SUPPLY APPARATUS

BACKGROUND OF THE INVENTION

1. Field of the Invention

The present invention relates to an automotive electric power supply apparatus provided with a belt-driven automotive dynamoelectric machine linked to an engine and an inverter unit for controlling the belt-driven automotive dynamoelectric machine.

2. Description of the Related Art

FIG. 8 is a conceptual diagram showing an automotive electric power supply apparatus using a conventional belt-driven automotive dynamoelectric machine, and FIG. 9 is a graph showing electric power output characteristics of the conventional dynamoelectric machine, the vertical axis representing output current in Amperes (A) and the horizontal axis representing rotational speed of the dynamoelectric machine in revolutions per minute (rpm).

In FIG. 8, a dynamoelectric machine 2 is a belt-driven dynamoelectric machine provided with: an armature winding 3 of a stator (not shown); and a field winding 4 of a rotor (not shown), the rotor being linked to a rotating shaft of an engine 1 by a belt (not shown). Here, the armature winding 3 is constructed by delta-connecting three phases of coil having four turns.

An inverter unit 5 is provided with: an inverter module 6 composed of a plurality of switching elements 8 and diodes 9 connected in parallel with each of the switching elements 8; and a capacitor 7 connected in parallel to the inverter module 6. This capacitor 7 has a role of smoothing the electric current flowing through the inverter module 6.

The inverter module 6 is constructed by forming element-diode sets each constituted by a switching element 8 and a diode 9 connected in parallel, connecting pairs of element-diode sets in series, disposing three such pairs in parallel, and sealing those components 8 and 9 integrally into a package. Each of the delta-connected end portions of the armature winding 3 is connected to a respective intermediate point between the switching elements 8 connected in series.

The switching operation of the switching elements 8 in the inverter module 6 is controlled by a control apparatus 10. When electric power is supplied, the dynamoelectric machine 2 operates as an electric starter motor to start the engine 1. After the engine 1 has started, the dynamoelectric machine 2 is driven to rotate by the engine 1 and operates as an alternator, generating a three-phase alternating-current voltage.

A first battery 11 constituting a driving electric power supply for the dynamoelectric machine 2 is connected in parallel to the inverter module 6. This dynamoelectric machine 2 is operated at high voltage (36 V, for example) by the first battery 11. Since the electrical machinery load mounted to an automotive vehicle is generally rated at 12 V, a 12-volt second battery 12 is also mounted. Thus, a direct-current-to-direct-current (DC-to-DC) converter 13 is connected in parallel to the inverter module 6 to enable the second battery 12 for driving the electric load to be charged.

In other words, during starting of the engine 1 by the dynamoelectric machine 2, it is necessary to increase the torque generated by the dynamoelectric machine 2, that is, to increase the amount of excitation current flowing to the armature winding 3. During operation with the second battery 12 for driving the electric load mounted to the automotive vehicle, loss in wiring becomes large, and in addition, the wiring itself is made larger in order to reduce wiring resistance. Thus, electric power transmission loss is reduced by increasing the voltage of the battery.

Next, operation of a conventional automotive electric power supply apparatus constructed in this manner will be explained.

First, the control apparatus 10 controls switching on and off of each of the switching elements 8 to generate three-phase alternating-current electric power from the direct-current electric power from the first battery 11. This three-phase alternating-current electric power is supplied to the armature winding 3 of the dynamoelectric machine 2, imparting a rotating magnetic field to the field winding 4 of the rotor and driving the rotor to rotate. Then, torque from the rotor is transferred to the engine 1 by means of the pulley and the belt (not shown), driving the engine 1 to rotate, that is, starting the engine 1.

Once the engine 1 has been started, torque from the engine 1 is transferred to the dynamoelectric machine 2 by means of the belt and the pulley- Thus, the rotor is driven to rotate, inducing a three-phase alternating-current voltage in the armature winding 3. Then, the control apparatus 10 controls switching on and off of each of the switching elements 8 to convert the three-phase alternating-current voltage induced in the armature winding 4 into a direct current. The first battery 11 is charged by the direct-current electric power rectified by the inverter unit 5. The direct-current electric power rectified by the inverter unit 5 is also converted to 12 V by the DC-to-DC converter 13 and supplied to the second battery 12.

Now, when the conventional dynamoelectric machine 2 is made to generate electricity in an alternator mode by switching each of the switching elements 8 off by means of the control apparatus 10, the electromotive force of the dynamoelectric machine 2 depends on the rotational speed of the rotor. In other words, when the rotational speed of the rotor of the dynamoelectric machine 2 is low, electric power generation in excess of a regulated voltage cannot be achieved in the alternator mode. Thus, when the rotational speed of the rotor is in a low-speed region, the dynamoelectric machine 2 must be made to generate electricity by an inverter mode.

In a conventional belt-driven automotive dynamoelectric machine, the torque transmission pulley ratio is around 2.5, and since the normal rotational speed region of a conventional engine is 1,200 to 3,000 rpm, the normal rotational speed region of the dynamoelectric machine 2 is 3,000 to 7,500 rpm.

Electric power generation by this dynamoelectric machine 2, as shown in FIG. 9, is switched from the inverter mode to the alternator mode when the rotational speed is in the vicinity of 7,000 rpm. Consequently, the dynamoelectric machine 2 generates electricity in the inverter mode over a large portion of its normal rotational speed region.

Electric power generation in this inverter mode is performed by switching each of the switching elements 8 by means of the control apparatus 10, and the faster the rotational speed of the dynamoelectric machine 2, the higher the rate at which the switching elements 8 are switched, that is, the higher the switching frequency. During electric power generation in the inverter mode, the electric current passing through the switching elements 8 is large compared to the electric current passing through the diodes 9 during electric power generation in the alternator mode. Thus, during electric power generation in the inverter mode, large currents are passed through the switching elements 8 continuously. Because the amount of heat generated in the switching elements 8 is great, the heat dissipation design of the inverter unit 5 is massive, water-cooled constructions, which have good cooling efficiency, being generally adopted to cool the inverter unit 5.

In an automotive electric power supply apparatus using a conventional belt-driven automotive dynamoelectric machine, because the dynamoelectric machine 2 generates electric power in the inverter mode, in which electric power generation loss is great compared to the alternator mode, over a large portion of its normal rotational speed region, some problems have been that a large-scale cooling construction is required for the inverter and also that the electric power generating efficiency of the dynamoelectric machine is reduced.

Furthermore, because it is necessary for the switching elements 8 to be controlled up to and in a high-speed rotation region of the dynamoelectric machine 2, thereby raising the switching frequency, another problem has been that the circuit configuration of the control apparatus 10 is complicated, leading to cost increases.

SUMMARY OF THE INVENTION

The present invention aims to solve the above problems and an object of the present invention is to provide an automotive electric power supply apparatus enabling cost reductions by setting the number of turns of an armature winding of a dynamoelectric machine such that the dynamoelectric machine can generate electric power in an alternator mode in a normal rotational speed region of the dynamoelectric machine, and controlling an inverter unit by a control apparatus such that the dynamoelectric machine is operated as an electric motor during starting of an engine by controlling switching on and off of switching elements and the dynamoelectric machine is made to generate electricity in the alternator mode after the engine has been started by switching the switching elements off to increase electric power generating efficiency of the dynamoelectric machine, to simplify and reduce a cooling construction of the inverter in size, and to simplify a circuit configuration of the control apparatus.

With the above object in view, an automotive electric power supply apparatus of the present invention includes a battery and an automotive dynamoelectric machine linked to an engine. The automotive dynamoelectric machine is driven by electric power from the battery to start the engine during starting of the engine and is driven by the engine to generate alternating-current power after the engine has been started. The automotive electric power supply apparatus includes an inverter having a plurality of element-diode sets, each element-diode set including a pair of switching elements connected in series between positive and negative terminals of the battery and a diode connected in parallel to the switching elements, a connection point of the switching elements connected in series being connected to the automotive dynamoelectric machine. The automotive electric power supply apparatus includes a control apparatus for controlling the inverter such that the automotive dynamoelectric machine is driven by switching the switching elements on and off to supply electric power from the battery to the automotive dynamoelectric machine during the starting of the engine, and the battery is charged by switching the switching elements off to enable the diodes to rectify alternating-current power generated in the automotive dynamoelectric machine into direct-current electric power at equal to or less than a normal rotational speed region of the engine.

Therefore, the present invention is provided the automotive electric power supply apparatus in which the efficiency of electric power generation by the dynamoelectric machine is increased, the cooling construction of the inverter can be simplified and reduced in size, and cost reductions are enabled by simplifying the circuit configuration of the control apparatus.

BRIEF DESCRIPTION OF THE DRAWINGS

FIG. 5A is a partially cut away side elevation explaining a construction of the inverter unit in the automotive electric power supply apparatus according to Embodiment 4 of the present invention;

FIG. 5B is a plan explaining a construction of the inverter unit in the automotive electric power supply apparatus according to Embodiment 4 of the present invention;

DETAILED DESCRIPTION OF THE PREFERRED EMBODIMENTS

Preferred embodiments of the present invention will now be explained with reference to the drawings.

Embodiment 1

Figure 1:
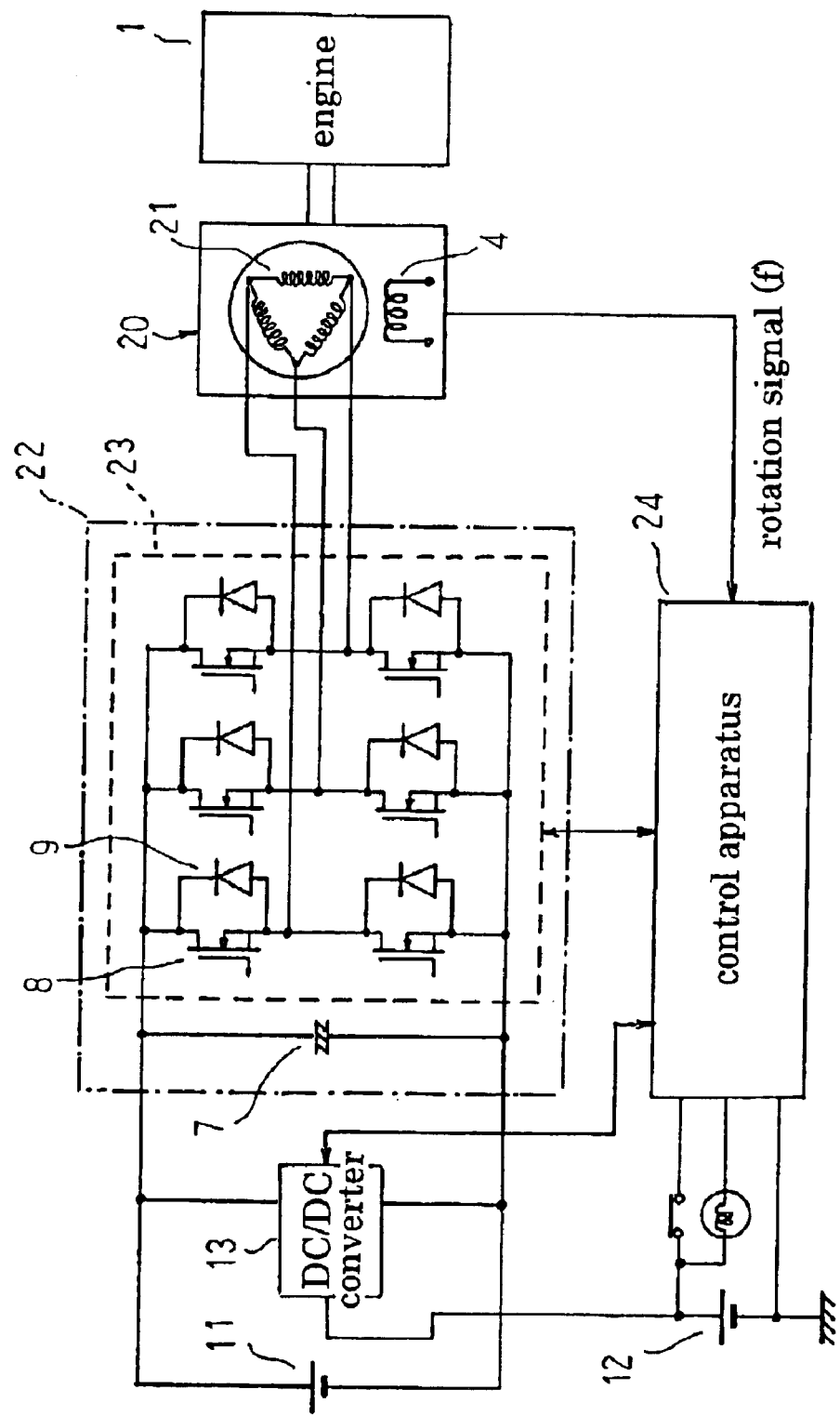
FIG. 1 is a conceptual diagram showing an automotive electric power supply apparatus using a belt-driven automotive dynamoelectric machine according to Embodiment 1 of the present invention.
Figure 2:
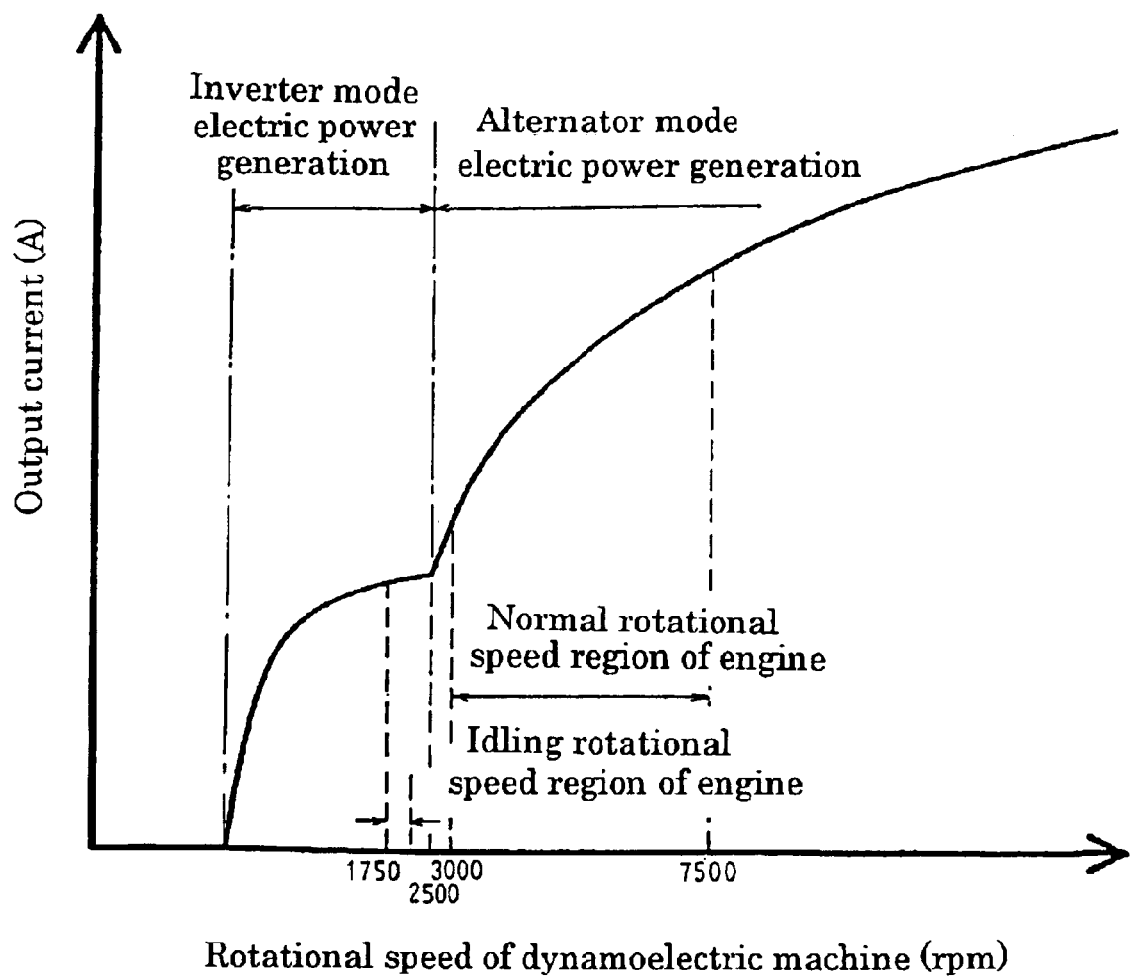
FIG. 2 is a graph showing electric power output characteristics of the dynamoelectric machine in the automotive electric power supply apparatus according to Embodiment 1 of the present invention.

FIG. 1 is a conceptual diagram showing an automotive electric power supply apparatus using a belt-driven automotive dynamoelectric machine according to Embodiment 1 of the present invention. FIG. 2 is a graph showing electric power output characteristics of the dynamoelectric machine in the automotive electric power supply apparatus according to Embodiment 1 of the present invention, the vertical axis of the graph representing output current in Amperes (A) and the horizontal axis representing rotational speed of the dynamoelectric machine in revolutions per minute (rpm).

In FIG. 1, a dynamoelectric machine 20 is a belt-driven automotive dynamoelectric machine, an armature winding 21 thereof being constructed by delta-connecting respective phases of coils having five turns. Furthermore, an inverter unit 22 and an inverter module 23 are constructed in a similar manner to the conventional inverter unit 5 and the conventional inverter module 6.

Figure 8:
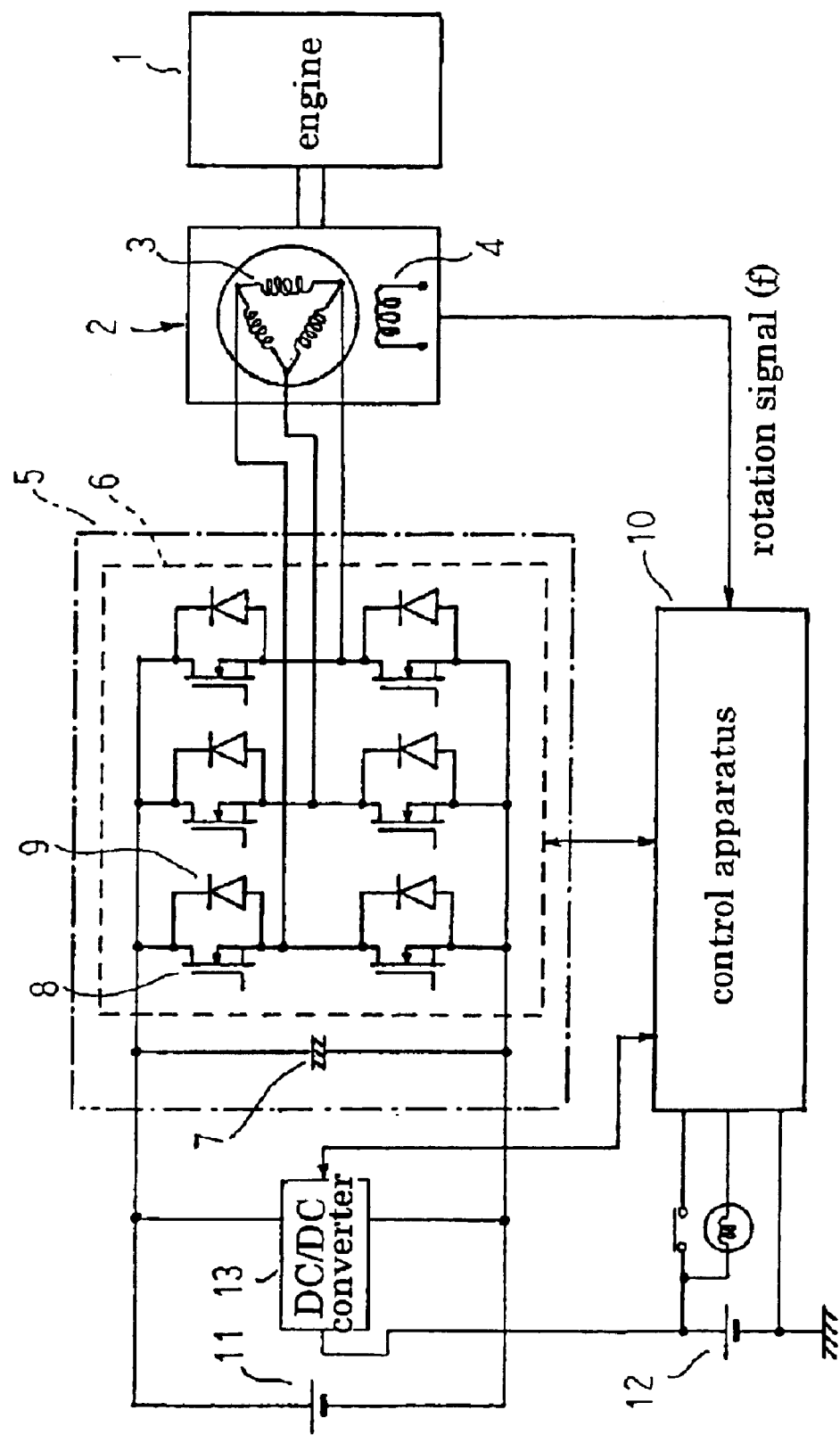
FIG. 8 is a conceptual diagram showing a conventional automotive electric power supply apparatus.
Figure 9:
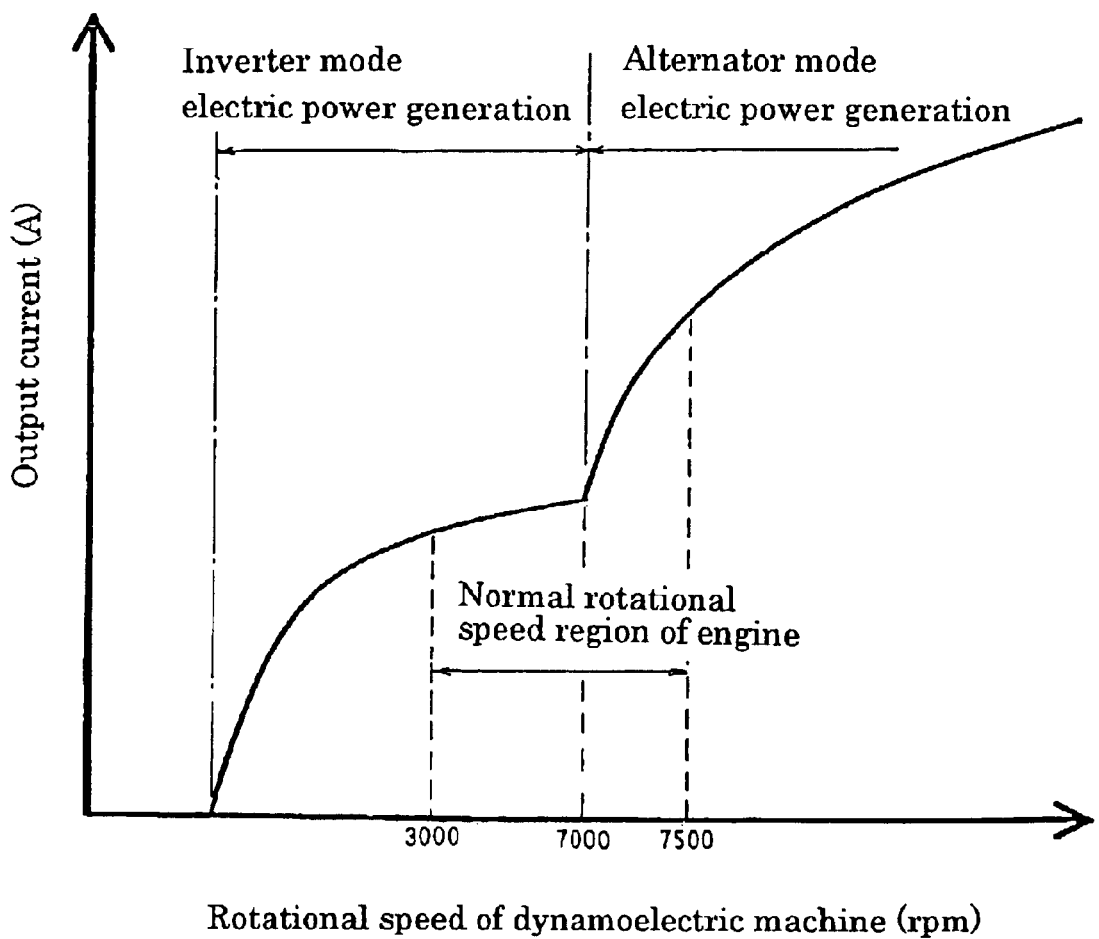
FIG. 9 is a graph showing electric power output characteristics of the conventional dynamoelectric machine.

Moreover, the rest of this embodiment is constructed in a similar manner to the automotive electric power supply apparatus shown in FIG. 8.

Next, the electric power output characteristics of the dynamoelectric machine in Embodiment 1 will be explained.

From FIG. 2, it can be seen that in the dynamoelectric machine 20, in which the number of turns in each of the phases of coil in the armature winding 21 is set to five turns, the changeover rotational speed between inverter mode electric power generation and alternator mode electric power generation is approximately 2,500 rpm, enabling alternator mode electric power generation in the normal rotational speed region of the engine. In other words, an automotive electric power supply apparatus can be achieved in which the dynamoelectric machine 20 can generate electric power in the alternator mode at least across the entire region of the normal rotational speed region of the engine.

Next, operation of the automotive electric power supply apparatus according to Embodiment 1 of the present invention will be explained.

First, a control apparatus 24 controls switching on and off of each of the switching elements 8 to generate three-phase alternating-current electric power from the direct-current electric power from the first battery 11. This three-phase alternating-current electric power is supplied to the armature winding 21 of the dynamoelectric machine 20, imparting a rotating magnetic field to the field winding 4 of the rotor and driving the rotor to rotate. Then, torque from the rotor is transferred to the engine 1 by means of the pulley and the belt (not shown), driving the engine 1 to rotate, that is, starting the engine 1.

Once the engine 1 has been started, torque from the engine 1 is transferred to the dynamoelectric machine 20 by means of the belt and the pulley. Thus, the rotor is driven to rotate, inducing a three-phase alternating-current voltage in the armature winding 21. The control apparatus 24 monitors the rotational speed of the rotor based on a rotation signal (f) from the dynamoelectric machine 20 and, when the rotational speed is less than 2,500 rpm, controls the switching on and off of each of the switching elements 8 to make the dynamoelectric machine 20 generate electricity in the inverter mode. When the rotational speed reaches 2,500 rpm, each of the switching elements 8 is switched off to make the dynamoelectric machine 20 generate electricity in the alternator mode. Thus, the inverter module 23 becomes a three-phase full-wave rectifier circuit in which sets of two diodes 9 are connected in series and three such sets are connected in parallel, the three-phase alternating-current voltage induced in the armature winding 21 being converted into direct current by the inverter unit 22. The first battery 11 is charged by the direct-current electric power rectified by the inverter unit 22. The direct-current electric power rectified by the inverter unit 22 is also converted to 12 V by the DC-to-DC converter 13 and supplied to the second battery 12.

Thus, according to Embodiment 1, because the number of turns in each of the phases of coil in the armature winding 21 is set to five turns, the changeover rotational speed between inverter mode electric power generation and alternator mode electric power generation can be reduced to 2,500 rpm.

Consequently, electric power generation in the inverter mode, in which the electric power generation loss is great compared to the alternator mode, is restricted to the rotational speed region less than 2,500 rpm. In other words, because the dynamoelectric machine 20 can generate electric power in the alternator mode at least across the entire region of the normal rotational speed region of the engine, the electric power generating efficiency of the dynamoelectric machine 20 is improved.

Furthermore, it is no longer necessary for switching on and off of the switching elements 8 to be controlled up to and in a high-speed rotation region of the dynamoelectric machine 20, simplifying control of the inverter unit 22. As a result, the circuit configuration of the control apparatus 24 is simplified, enabling cost reductions.

In Embodiment 1, because the number of turns in each of the phases of coil in the armature winding 21 is increased compared to the number of turns in each of the phases of coil in the armature winding 2 of the conventional automotive electric power supply apparatus, the quantity of electric current required to be passed through the armature winding to generate equivalent torque can be reduced. Thus, according to Embodiment 1, because the volume of electric current passed through the switching elements 8 can be set small compared to the conventional automotive electric power supply apparatus, switching elements 8 of small current capacity can be adopted, enabling the volume and cost of the inverter unit 22 to be reduced, and also a massive heat dissipation design for the inverter unit 22 is no longer necessary, enabling reductions in the size of the inverter unit 22.

Now, in alternator mode electric power generation, the voltage induced in the armature winding 21 increases as the rotational speed of the rotor increases. The electric power generated by the dynamoelectric machine 20 can only be extracted as output when the direct-current voltage resulting from the voltage which was induced in the armature winding 21 being three-phase full wave rectified exceeds the voltage of the first battery 11. The rotational speed of the rotor at which the output current of alternator mode electric power generation exceeds the output current of inverter mode electric power generation is the changeover rotational frequency between inverter mode electric power generation and alternator mode electric power generation.

The voltage induced in the armature winding 21 is increased by increasing the number of turns in each of the phases of coil of the armature winding 21. Consequently, by increasing the number of turns in each of the phases of coil, the changeover rotational frequency between inverter mode electric power generation and alternator mode electric power generation can be shifted to a lower rotational speed.

The present invention for the dynamoelectric machine reasonably to be mounted on an engine was conceived when it was found, based on the above considerations, that the changeover rotational frequency between inverter mode electric power generation and alternator mode electric power generation can be reduced to equal to or less than the normal rotational speed region of the engine by designing the dynamoelectric machine so as to satisfy an expression $\{E/(p^2w)\}<0.04$, where E is the regulated voltage during electric power generation, p is the number of magnetic poles in the rotor, and w is the number of series conductors in the armature winding per magnetic pole (the number of turns).

Moreover, in Embodiment 1 above, since the electric power supply is the 36-volt first battery 11, the regulated voltage is 42 V, and because the number of magnetic poles in the rotor is sixteen, $\{E/(p^2w)\}<0.04$ is satisfied if the number of turns w is set to equal to or greater than 5. However, it goes without saying that the number of turns w will vary according to the regulated voltage (E) and the number of magnetic poles (p) in the rotor.

Embodiment 2

In Embodiment 2, the number of turns in each of the phases of coil in the armature winding 21 of the dynamoelectric machine 20 is set to six turns.

Moreover, the rest of this embodiment is constructed in a similar manner to Embodiment 1 above.

Figure 3:
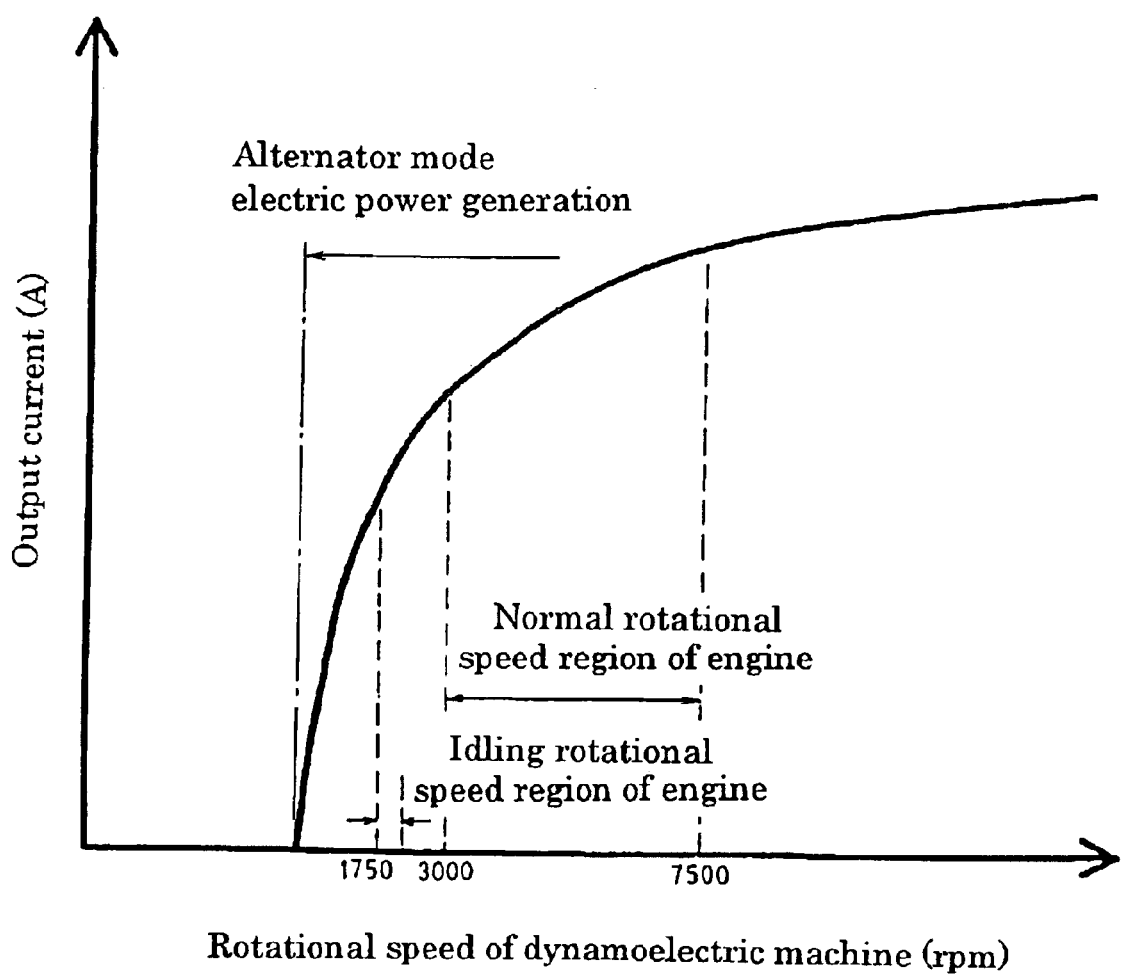
FIG. 3 is a graph showing electric power output characteristics of a dynamoelectric machine in an automotive electric power supply apparatus according to Embodiment 2 of the present invention.

In the automotive electric power supply apparatus according to Embodiment 2, as shown in FIG. 3, it can be seen that the dynamoelectric machine 20 can perform alternator mode electric power generation at a point when rotation commences.

In Embodiment 2, the control apparatus 24 switches the switching elements 8 off at the point when the rotor rotates based on a rotation signal (f) from the dynamoelectric machine 20 to make the dynamoelectric machine 20 perform alternator mode electric power generation.

According to Embodiment 2, a circuit design in which inverter mode electric power generation is not performed becomes possible, simplifying the cooling construction of the inverter unit 22.

Control of switching on and off of the switching elements 8 is only performed when the dynamoelectric machine 20 is operated as an electric starter motor, and because control of the inverter unit 22 is simplified, the circuit configuration of the control apparatus 24 is further simplified, enabling further cost reductions.

In addition, in Embodiment 2, control of switching on and off of the switching elements 8, which requires large currents, is only performed when the dynamoelectric machine 20 is operated as an electric starter motor, and furthermore, because the amount of control time is 0.3 second to 1 second, the generation of heat by the switching elements 8 is momentary. Thus, water-cooled constructions having good cooling efficiency do not necessarily have to be adopted in the cooling of the inverter unit 22, and by designing a heat sink having a thermal capacity capable of adequately receiving this quantity of lost heat, it is possible to adopt a natural air cooling system in the cooling of the inverter unit 22. Adoption of water-cooled constructions requires complicated piping, giving rise to poor mountability and increases in costs, but if an air cooling system is adopted, mountability is improved, enabling cost reductions.

Embodiment 3

In Embodiment 2 above, the dynamoelectric machine 20 is driven by the 36-volt first battery 11, but in Embodiment 3, the dynamoelectric machine 20 is driven by the 12-volt second battery 12.

In other words, because the number of turns in each of the phases of coil in the armature winding 21 of the dynamoelectric machine 20 is six turns, sufficient torque to start the engine 1 can be generated even if the quantity of electric current passed through the armature winding 21 is reduced. Thus, electric power transmission loss is reduced, enabling the dynamoelectric machine 20 to be driven using the 12-volt second battery 12.

According to Embodiment 3, because the dynamoelectric machine 20 is driven by the second battery 12, the DC-to-DC converter 13 is no longer necessary, enabling further cost reductions and reductions in the size of the inverter unit 22 to be achieved.

Embodiment 4

Figure 4:
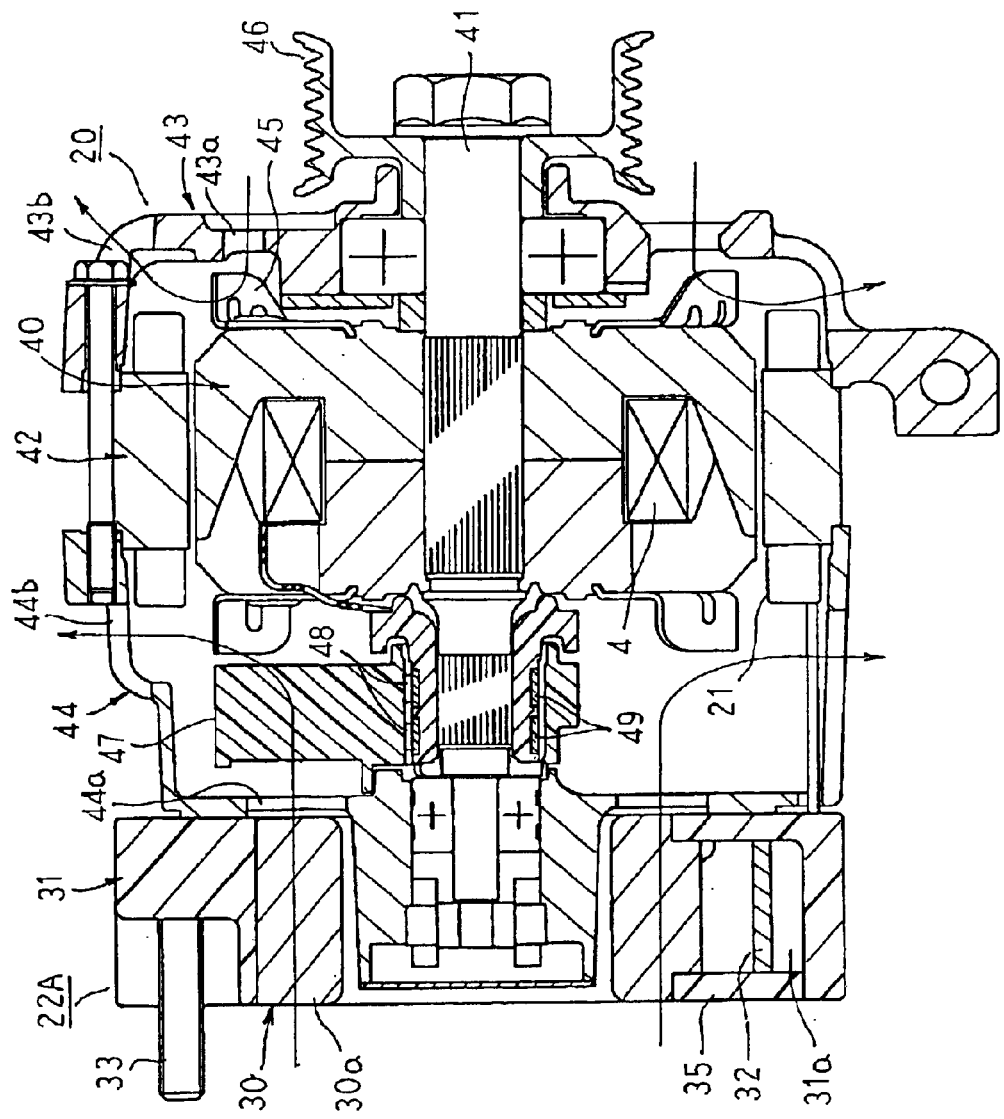
FIG. 4 is a longitudinal section explaining a mounting construction for an inverter unit in an automotive electric power supply apparatus according to Embodiment 4 of the present invention.

In Embodiment 1 above, the inverter unit 22 is constructed as a separate part from the dynamoelectric machine 20 and the inverter unit 22 is installed separately from the dynamoelectric machine 20, but in Embodiment 4, as shown in FIG. 4, the inverter unit 22 is mounted to an end surface (an outer wall surface) of a rear bracket 44 of the dynamoelectric machine 20.

FIG. 4 is a longitudinal section explaining a mounting construction for an inverter unit in an automotive electric power supply apparatus according to Embodiment 4 of the present invention, and FIGS. 5A and 5B are diagrams explaining a construction of the inverter unit in the automotive electric power supply apparatus according to Embodiment 4 of the present invention, FIG. 5A being a partially cut away side elevation and FIG. 5B being a plan thereof.

In FIGS. 4, 5A, and 5B, the dynamoelectric machine 20 is provided with: a Lundell-type rotor 40 fixed to a shaft 41 and rotatably mounted to a front bracket 43 and a rear bracket 44; a stator 42 disposed so as to be held between side and end portions of the front bracket 43 and the rear bracket 44 and surround the rotor 40; fans 45 fixed to first and second axial end surfaces of the rotor 40; a pulley 46 fixed to a front-end end portion of the shaft 41; a brush holder 47 disposed on an inner wall surface of the rear bracket 44 so as to be positioned on an outer periphery of a rear end of the shaft 41; and a pair of brushes 48 disposed inside the brush holder 47 so as to slide in contact with a pair of slip rings 49 mounted to the rear end of the shaft 41. This dynamoelectric machine 20 is linked to the engine 1 by means of the pulley 46 and a belt (not shown).

Front-end and rear-end air intake apertures 43a and 44a are disposed through end surfaces of the front bracket 43 and the rear bracket 44, respectively, and front-end and rear-end air discharge apertures 43b and 44b are disposed through side surfaces of the front bracket 43 and the rear bracket 44, respectively.

The inverter unit 22A is provided with: a heat sink 30 being designed for heat dissipation so as to have a thermal capacity capable of adequately receiving the quantity of lost heat resulting from the generation of heat by the switching elements 8; a resin-molded portion 31 formed integrally with an outer peripheral portion of the heat sink 30 using an electrically-insulating resin; a control circuit board 32 mounted with electronic components for controlling switching on and off of the switching elements 8; and electric power terminals 33 and 34.

The heat sink 30 is prepared in a C shape using a good thermal conductor such as copper, aluminum, etc., a plurality of fins 30a being formed on inner peripheral surfaces thereof in a circumferential direction, and three flat surfaces 30b being formed on outer peripheral surfaces thereof. Two element-diode sets, each being constituted by a switching element 8 and a diode 9 connected in parallel, are fixed to each of the flat surfaces 30b.

A housing space 31a is formed in the resin-molded portion 31 for housing a component group including the switching elements 8 and the diodes 9, and the control circuit board 32. Each of the flat surfaces 30b of the heat sink 30 is exposed inside the housing space 31a. In addition, although not shown, insert conductors are insert molded into the resin-molded portion 31, portions of the insert conductors being exposed at predetermined positions as connection terminals. Moreover, the electric power terminals 33 and 34 are mounted to the resin-molded portion 31, each being electrically connected to the connection terminals, which constitute a positive electrode and a negative electrode of the inverter unit.

The switching elements 8 and the diodes 9 are fixed to each of the flat surfaces 30b, each of the terminals of the control circuit board 32 being electrically connected to the respective terminals of the switching elements 8 and the diodes 9 and mounted inside the housing space 31a. Finally, after connecting the control circuit board 32 and the connection terminals of the insert conductors, the housing space 31a is sealed by a cap 35 to complete assembly of the inverter unit 22A.

The inverter unit 22A assembled in this manner is disposed such that a longitudinal direction of the fins 30a (a direction perpendicular to the surface of the page in FIG. 5B) is aligned with an axial direction of the shaft 41 so as to surround the shaft 41, and is mounted to an end surface (an outer wall surface) of the rear bracket 44 by metal mounting fittings (not shown). Then, the delta-connected end portions of the armature winding 21 are joined to the connection terminals of the insert conductors, which are connected to the intermediate points of the switching elements 8 connected in series. Finally, the electric power terminals 33 and 34 are connected to the first battery 11. Thus, an electric power supply circuit equivalent to the circuit shown in FIG. 1 is constructed.

In Embodiment 4, the fans 45 are driven when the rotor 40 is driven to rotate. Thus, as indicated by the arrows in FIG. 4, cooling airflows are formed in which cooling air is introduced into the front and rear brackets 43 and 44 through the front-end and rear-end air intake apertures 43a and 44a, are deflected centrifugally by the fans 45, and are discharged through the front-end and rear-end air discharge apertures 43b and 44b. The armature winding 21 is cooled by these cooling airflows. At this time, one of the cooling airflows flows over the fins 30a of the heat sink 30, and heat generated in the switching elements 8 and the diodes 9 is dissipated through the fins 30a to the cooling airflow.

The electric power generated in the alternator mode of the dynamoelectric machine 20 is converted into direct current by the inverter unit 22 and then supplied to the battery by means of the electric power terminals 33 and 34.

Moreover, in Embodiment 4, the dynamoelectric machine 20 is also designed so as to satisfy the expression $\{E/(p^2w)\}<0.04$, and in a similar manner to Embodiment 2 above, the dynamoelectric machine 20 is operated as an electric starter motor during starting of the engine by controlling the switching on and off of each of the switching elements 8, and the dynamoelectric machine 20 generates electric power in the alternator mode not just in the normal rotational speed region of the engine but in the entire rotational speed region of the engine after the engine 1 has been started by switching the switching elements 8 off.

In Embodiment 1 above, because the inverter unit 22 is constructed as a separate part from the dynamoelectric machine 20, and the inverter unit 22 is installed separately from the dynamoelectric machine 20, connected wiring harnesses are long, and there are problems such as weight increases and poor disturbance noise tolerance.

However, according to Embodiment 4, because the inverter unit 22A is mounted integrally with the rear bracket 44, the connected wiring harnesses can be shortened, enabling weight reductions in the harnesses and improvements in disturbance noise tolerance.

Because the heat sink 30 is designed for heat dissipation so as to have a thermal capacity capable of adequately receiving the quantity of lost heat resulting from the generation of heat by the switching elements 8, reductions in the size of the heat sink 30, in other words, reductions in the size of the inverter unit 22A, are enabled, improving the mountability of the inverter unit 22A onto the rear bracket 44.

Because the inverter unit 22A shares the same cooling medium as the dynamoelectric machine 20 (the cooling airflow), the cooling construction is simplified.

By disposing the fins 30a in the heat sink 30 of the inverter unit 22A and making the cooling airflow formed by the driving of the fans 45 flow along the fins 30a, heat generated by the switching elements 8 and the diodes 9 is transferred to the heat sink 30 and is then dissipated through the fins 30a to the cooling airflow. Consequently, cooling efficiency is high compared to natural cooling constructions, further promoting reductions in the size of the heat sink 30.

Embodiment 5

Figure 6:
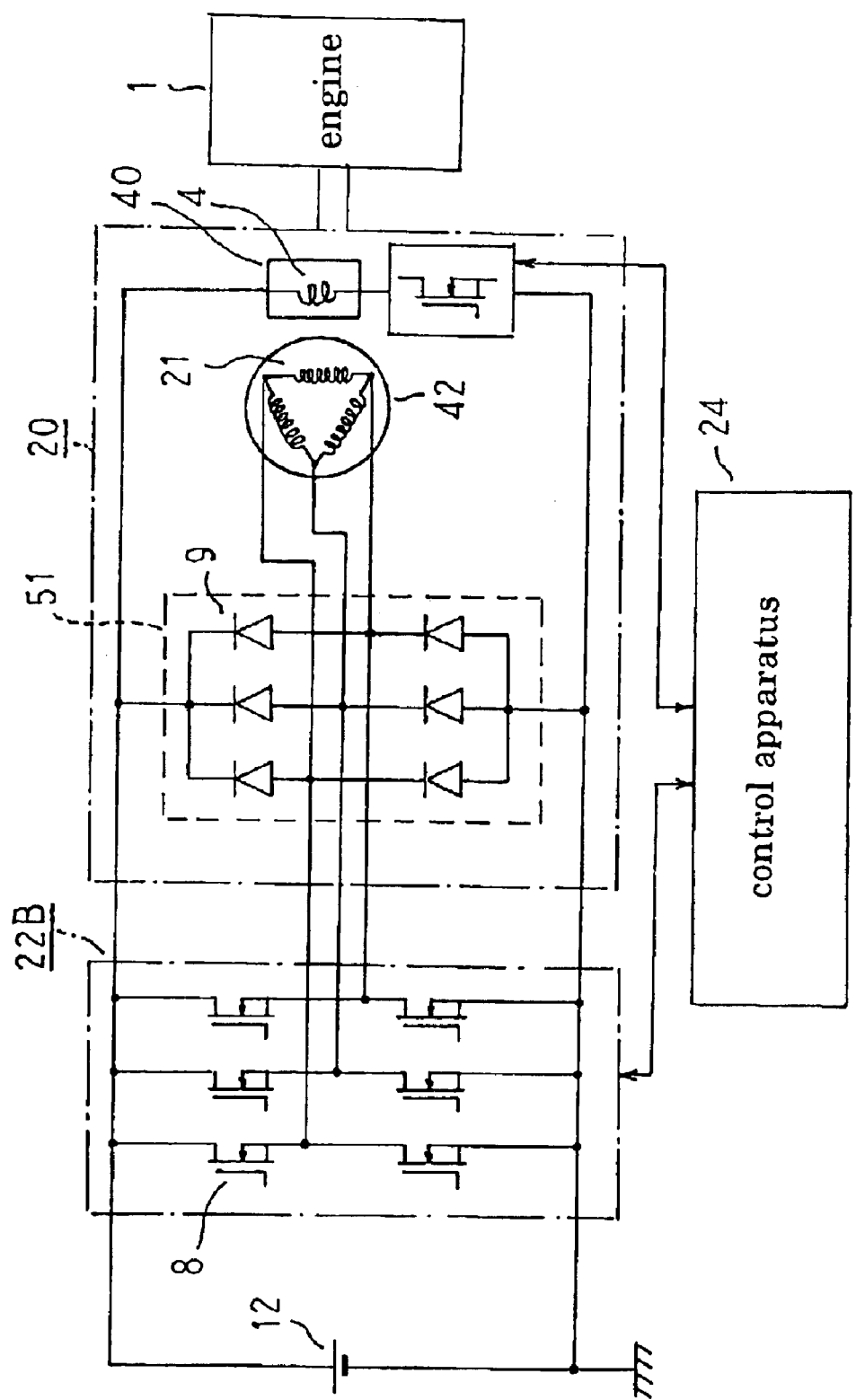
FIG. 6 is a conceptual diagram showing an automotive electric power supply apparatus using a belt-driven automotive dynamoelectric machine according to Embodiment 5 of the present invention.
Figure 7:
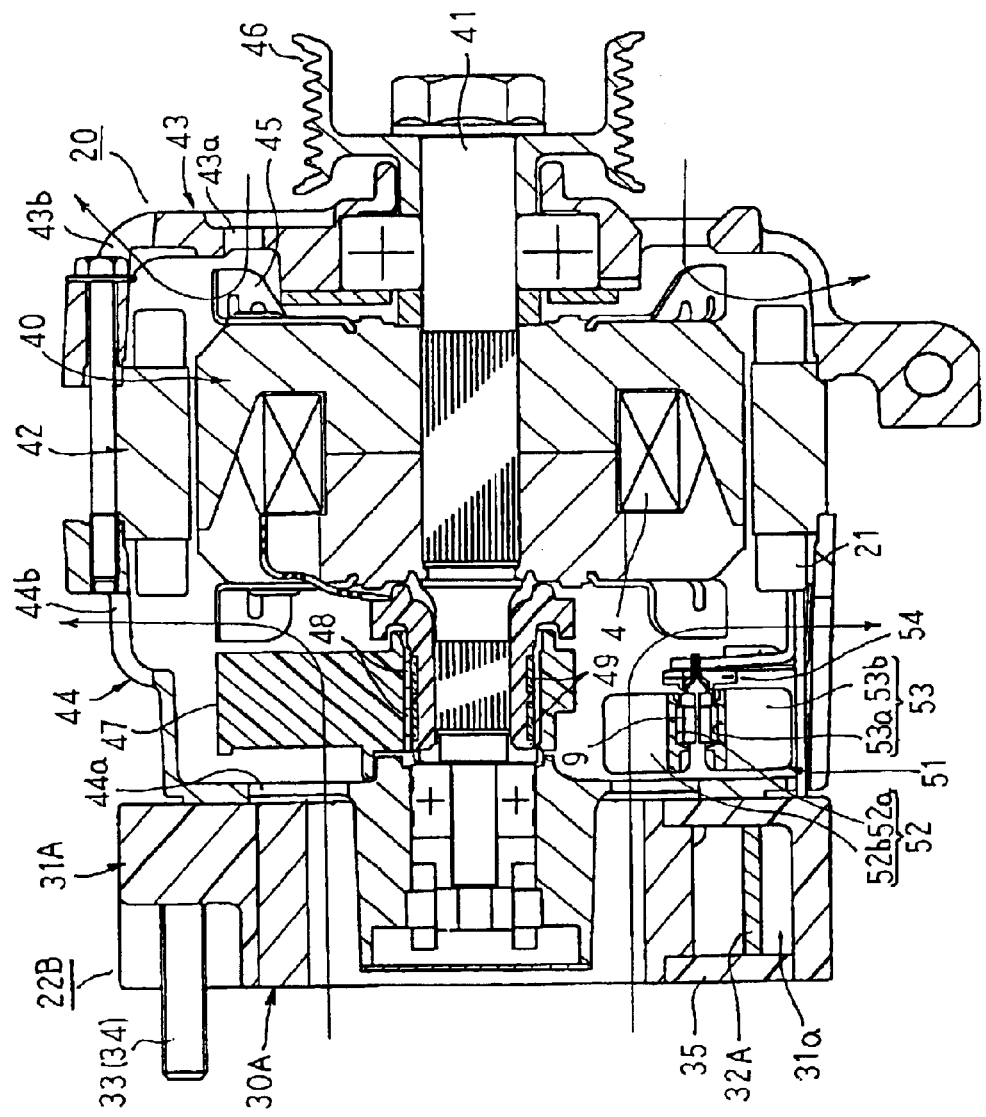
FIG. 7 is a longitudinal section explaining a mounting construction for an inverter unit in the automotive electric power supply apparatus according to Embodiment 5 of the present invention.

FIG. 6 is a conceptual diagram showing an automotive electric power supply apparatus using a belt-driven automotive dynamoelectric machine according to Embodiment 5 of the present invention, and FIG. 7 is a longitudinal section explaining a mounting construction for an inverter unit in the automotive electric power supply apparatus according to Embodiment 5 of the present invention.

In Embodiment 4 above, the inverter unit 22A is constructed by disposing the switching elements 8 and the diodes 9 together, but in Embodiment 5, as shown in FIG. 6, an inverter circuit portion (an inverter unit 22B) composed of switching elements 8 and a three-phase full-wave rectifier circuit portion (a rectifier 51) composed of diodes 9 are constructed as separate parts. The dynamoelectric machine 20 is driven by the 12-volt second battery 12.

The inverter unit 22B is provided with: a heat sink 30A; a resin-molded portion 31A formed integrally with an outer peripheral portion of the heat sink 30A using an electrically-insulating resin; a control circuit board 32A mounted with electronic components for controlling switching on and off of the switching elements 8; and electric power terminals 33 and 34.

The heat sink 30A is prepared in a C shape using a good thermal conductor such as copper, aluminum, etc., three flat surfaces 30b being formed on an outer peripheral surfaces thereof. Two switching elements 8 connected in parallel are fixed to each of the flat surfaces 30b.

A housing space 31a is formed in the resin-molded portion 31A for housing the switching elements 8 and the control circuit board 32A Each of the flat surfaces 30b of the heat sink 30A is exposed inside the housing space 31a. In addition, although not shown, insert conductors are insert molded into the resin-molded portion 31A, portions of the insert conductors being exposed at predetermined positions as connection terminals. Moreover, the electric power terminals 33 and 34 are mounted to the resin-molded portion 31A, each being electrically connected to the connection terminals, which constitute a positive electrode and a negative electrode of the inverter unit.

The switching elements 8 are fixed to each of the flat surfaces 30b, each of the terminals of the control circuit board 32A being electrically connected to the respective terminals of the switching elements 8 and mounted inside the housing space 31a. Finally, after connecting the control circuit board 32A and the connection terminals of the insert conductors, the housing space 31a is sealed by a cap 35 to complete assembly of the inverter unit 22B.

The rectifier 51 is provided with: an arc-shaped first heat sink 52 having a first surface functioning as a first component mounting surface 52a, a plurality of first fins 52b being formed so as to stand erect on a second surface thereof, a second heat sink 53 having a first surface functioning as a second component mounting surface 53a, a plurality of second fins 52b being formed so as to stand erect on a second surface thereof, the second heat sink 53 being formed into an arc shape having a larger diameter than that of the first heat sink 52 and being disposed on an outer periphery of the first heat sink 52 such that the first and second component mounting surfaces 52a and 53a are positioned in a common plane; and a circuit board 54 formed into an arc shape using an electrically-insulating resin, being disposed on the first and second component mounting surface 52a and 53a of the first and second heat sinks 52 and 53.

The first and second heat sinks 52 and 53 are each prepared using a good thermal conductor such as copper, aluminum, etc., three diodes 9 being mounted to each of the first and second component mounting surfaces 52a and 53a, respectively. Although not shown, insert conductors are insert molded into the circuit board 54, portions of the insert conductors being exposed at predetermined positions as connection terminals.

The rectifier 51 is assembled by disposing the second heat sink 53 on the outer periphery of the first heat sink 52 such that the first and second component mounting surfaces 52a and 53a are positioned in a common plane, disposing the circuit board 54 on the first and second component mounting surfaces 52a and 53a of the first and second heat sinks 52 and 53, and connecting each of the terminals of the diodes 9 to the connection terminals of the circuit board 54.

As shown in FIG. 7, the inverter unit 22B into which the switching elements 8 constituting the inverter circuit portion are incorporated is mounted to an end surface (an outer wall surface) of the rear bracket 44 of the dynamoelectric machine 20, and the rectifier 51 is mounted to an inner wall surface of the rear bracket 44. Then, the intermediate points of the switching elements 8 connected in series and the intermediate points of the diodes 9 connected in series are electrically connected to the delta-connected end portions of the armature winding 21. Finally, the electric power terminals 33 and 34 are connected to the second battery 12. Thus, the electric power supply circuit shown in FIG. 6 is constructed.

In Embodiment 5, the fans 45 are driven when the rotor 40 is driven to rotate. Thus, in a similar manner to Embodiment 4 above, cooling airflows are formed in which cooling air is introduced into the front and rear brackets 43 and 44 through the front-end and rear-end air intake apertures 43a and 44a, are deflected centrifugally by the fans 45, and are discharged through the front-end and rear-end air discharge apertures 43b and 44b. The armature winding 21 is cooled by these cooling airflows. At this time, one of the cooling airflows flows over the inner peripheral surface of the heat sink 30A, heat generated in the switching elements 8 being dissipated to the cooling airflow. One of the cooling airflows also flows over the first and second fins 52b and 53b of the first and second heat sinks 52 and 53, heat generated in the diodes 9 being dissipated through the fins 52b and 53b to the cooling airflow.

The electric power generated in the alternator mode of the dynamoelectric machine 20 is converted into direct current by the rectifier 51 and then supplied to the second battery 12 by means of the electric power terminals 33 and 34.

Moreover, in Embodiment 5, the dynamoelectric machine 20 is also designed so as to satisfy the expression $\{E/(p^2w)\}<0.04$, and in a similar manner to Embodiment 2 above, the dynamoelectric machine 20 is operated as an electric starter motor during starting of the engine by controlling the switching on and off of each of the switching elements 8, and the dynamoelectric machine 20 generates electric power in the alternator mode not just in the normal rotational speed region of the engine but in the entire rotational speed region of the engine after the engine 1 has been started by switching the switching elements 8 off.

According to Embodiment 5, because the inverter unit 22B only has an inverter circuit portion constituted by the switching elements 8, the inverter unit 22B is activated only during starting of the engine 1. Consequently, the constant generation of heat loss by the inverter unit 22B is eliminated, facilitating the heat dissipation design of the inverter unit 22B. In other words, if the heat sink of the inverter unit 22B is designed so as to have a thermal capacity sufficient to enable cooling of the heat generated by passage of an electric current during starting of the engine 1, it is possible to eliminate the heat-dissipating fins. Thus, reductions in the size of the inverter unit 22B are promoted, enabling mountability to be improved significantly.

In Embodiment 5, because the inverter unit 22B is also mounted integrally with the rear bracket 44, the connected wiring harnesses can be shortened, enabling weight reductions in the harnesses and improvements in disturbance noise tolerance.

Because the inverter unit 22B shares the same cooling medium as the dynamoelectric machine 20 (the cooling airflow), the cooling construction is simplified.

Because the dynamoelectric machine 20 is driven by the 12-volt second battery 12, the DC-to-DC converter 13 is no longer necessary, enabling reductions in size and cost.

Moreover, in each of the above embodiments, the armature winding 21 is constructed by delta-connecting three phases of coil, but similar effects can also be achieved in the present invention if an armature winding constructed by Y-connecting three phases of coil is adopted instead of the armature winding 21.

In each of the above embodiments, the armature winding 21 is constructed by forming three phases of coil into an alternating-current connection (a delta connection, for example), but the number of phases constituting the armature winding is not limited to three phases and may also be four phases or five phases, for example.

In each of the above embodiments, the inverter units are explained as being cooled by cooling systems in which the cooling media are water or air, but a cooling system in which the cooling medium is oil may also be adopted.

The automotive electric power supply apparatus according to the present invention can be used as an electric power supply apparatus for a diesel automobile, a gasoline engine automobile, a hybrid automobile, etc.

The present invention is constructed in the above manner and exhibits the effects described below.

According to one aspect of the present invention, there is provided an automotive electric power supply apparatus including:

a battery;

an automotive dynamoelectric machine linked to an engine, the automotive dynamoelectric machine being driven by electric power from the battery to start the engine during starting of the engine, and being driven by the engine to generate alternating-current power after the engine has been started;

an inverter having a plurality of element-diode sets, each element-diode set including a pair of switching elements connected in series between positive and negative terminals of the battery and a diode connected in parallel to the switching elements, a connection point of the switching elements connected in series being connected to the automotive dynamoelectric machine; and a control apparatus for controlling the inverter such that the automotive dynamoelectric machine is driven by switching the switching elements on and off to supply electric power from the battery to the automotive dynamoelectric machine during the starting of the engine, and the battery is charged by switching the switching elements off to enable the diodes to rectify alternating-current power generated in the automotive dynamoelectric machine into direct-current electric power at equal to or less than a normal rotational speed region of the engine, enabling an automotive electric power supply apparatus to be achieved in which the efficiency of electric power generation by the dynamoelectric machine is increased, the cooling construction of the inverter can be simplified and reduced in size, and cost reductions are enabled by simplifying the circuit configuration of the control apparatus.

A cooling system for the inverter may be an air cooling system, simplifying the cooling construction.

The inverter may be constructed such that the switching elements and diodes are mounted to a heat sink, heat generated by the switching elements and diodes being dissipated by means of the heat sink, enabling the inverter to be cooled efficiently even if air is used as a cooling medium.

The heat sink may have a heat-dissipating fin, further improving cooling efficiency.

The inverter may be mounted integrally to the automotive dynamoelectric machine, enabling the weight of a wiring harness to be reduced and also enabling disturbance noise tolerance to be increased.

The inverter may be constructed so as to be divided into an inverter circuit portion constituted by the switching elements and a rectifier circuit portion constituted by the diodes, the rectifier circuit portion being mounted inside the automotive dynamoelectric machine, enabling reductions in the size of the inverter circuit portion, thereby improving the mountability of the inverter circuit portion.

The inverter may be cooled by a cooling medium of the automotive dynamoelectric machine, simplifying the cooling construction, thereby enabling reductions in size and cost.

The control apparatus may be constructed such that the inverter is controlled such that the switching elements are switched off when starting of the engine is detected, eliminating inverter mode electric power generation, thereby facilitating the cooling design of the inverter.

The automotive dynamoelectric machine may be constructed so as to satisfy an expression $\{E/(p^2w)\}<0.04$, where E is a regulated voltage during electric power generation, p is the number of magnetic poles in a rotor, and w is the number of series conductors in an armature winding per magnetic pole, enabling the changeover rotational frequency between inverter mode electric power generation and alternator mode electric power generation to be reduced to equal to or less than the normal rotational speed region of the engine.

What is claimed is:

1. An automotive electric power supply apparatus comprising:
    a battery;
    an automotive dynamoelectric machine linked to an engine, said automotive dynamoelectric machine being driven by electric power from said battery to start said engine during starting of said engine, and being driven by said engine to generate alternating-current power after said engine has been started;
    an inverter having a plurality of element-diode sets, each element-diode set including a pair of switching elements connected in series between positive and negative terminals of said battery and a diode connected in parallel to said switching elements, a connection point of said switching elements connected in series being connected to said automotive dynamoelectric machine; and
    a control apparatus for controlling said inverter such that said automotive dynamoelectric machine is driven by switching said switching elements on and off to supply electric power from said battery to said automotive dynamoelectric machine during said starting of said engine, and said battery is charged by switching said switching elements off to enable said diodes to rectify alternating-current power generated in said automotive dynamoelectric machine into direct-current electric power at least across an entire normal rotational speed region of said engine,
    wherein said automotive dynamoelectric machine is constructed so as to satisfy an expression $\{E/(p^2w)\}<0.04$, where E is a regulated voltage during electric power generation, p is the number of magnetic poles in a rotor, and w is the number of series conductors in an armature winding per magnetic pole.

2. The automotive electric power supply apparatus according to claim 1, wherein:
    a cooling system for said inverter is an air cooling system.

3. The automotive electric power supply apparatus according to claim 2, wherein:
    said inverter is constructed such that said switching elements and diodes are mounted to a heat sink, heat generated by said switching elements and diodes being dissipated by means of said heat sink.

4. The automotive electric power supply apparatus according to claim 3, wherein:
    said heat sink has a heat-dissipating fin.

5. The automotive electric power supply apparatus according to claim 1, wherein:
    said inverter is mounted integrally to said automotive dynamoelectric machine.

6. The automotive electric power supply apparatus according to claim 5, wherein:
    said inverter is cooled by a cooling medium of said automotive dynamoelectric machine.

7. The automotive electric power supply apparatus according to claim 5, wherein:
    said inverter is constructed so as to be divided into an inverter circuit portion constituted by said switching elements and a rectifier circuit portion constituted by said diodes, said rectifier circuit portion being mounted inside said automotive dynamoelectric machine.

8. The automotive electric power supply apparatus according to claim 7, wherein:
    said inverter is cooled by a cooling medium of said automotive dynamoelectric machine.

9. The automotive electric power supply apparatus according to claim 1, wherein:
    said control apparatus is constructed such that said inverter is controlled such that said switching elements are switched off when starting of said engine is detected.

10. The automotive electric power supply apparatus according to claim 1, wherein:
    the normal rotational speed region of said engine is 1,200 rpm to 3,000 rpm.

11. The automotive electric power supply apparatus according to claim 1, wherein:
    the automotive dynamoelectric machine includes an armature winding having a plurality of phase coils, each phase coil having a predetermined number of turns.

12. The automotive electric power supply apparatus according to claim 11, wherein:
    the phase coils are delta-connected.

13. The automotive electric power supply apparatus according to claim 11, wherein:

the predetermined number of turns is greater than four.

14. The automotive electric power supply apparatus according to claim 1, wherein:

the control apparatus switches the switching elements on and off based on a signal received from the automotive dynamoelectric machine.

* * * * *